United States Patent Office 3,442,860
Patented May 6, 1969

3,442,860
PROCESS FOR THE MANUFACTURE OF CO-
POLYMERS OF TRIOXANE CAPABLE OF BE-
ING CROSS-LINKED BY LIGHT
Karl-Heinz Hafner, Bad Orb, Edgar Fischer, Frankfurt am Main, and Gunther Mebwarb, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed June 21, 1966, Ser. No. 559,088
Claims priority application Germany, June 30, 1965, F 46,473
Int. Cl. C08g 1/14; C08f 1/16
U.S. Cl. 260—52               2 Claims

ABSTRACT OF THE DISCLOSURE

Copolymers and terpolymers of trioxane capable of being cross-linked by light are obtained by copolymerizing 70 to 99.5% by weight of trioxane, 0 to 10% by weight of cyclic ethers and 0.5 to 20% by weight of unsaturated aromatic glycidyl ethers containing a C=C double bond in conjugation with a carbonyl group and a benzene nucleus in the presence of cationic catalysts at temperatures in the range of −50° C. to +110° C.

---

The present invention relates to a process for the manufacture of copolymers of trioxane capable of being cross-linked by light.

It is known that trioxane forms copolymers with cyclic ethers or acetals in the presence of cationic catalysts, which copolymers are resistant to alkaline degradation and constitute valuable plastics owing to their good mechanical and physical properties. It is also known that trioxane can be copolymerized with olefinically unsaturated compounds, for example styrene, the double bond participating in the copolymerization. It has furthermore been proposed to copolymerize trioxane with bifunctional compounds, for example, cyclohexene-1,2-oxide-4,4-dioxymethylene-formal and β,γ-epoxypropoxy-β',γ'-carbonatopropoxy-alkanes. By proceeding in this manner, polymers are obtained which are cross-linked under the polymerization conditions already or in a subsequent heat treatment.

Now we have found that copolymers of 70 to 99.5% by weight of trioxane, 0.5 to 20% by weight of bifunctional compounds and 0 to 10% by weight of cyclic ethers can be obtained in an advantageous manner in the presence of cationic catalysts at temperatures within the range of from −50° to +110° C., by using a bifunctional compound of the formula

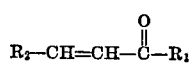

in which $R_1$ represents an O-alkyl radical with 1 to 6 carbon atoms if $R_2$ is a radical of Formula B given below, or $R_1$ represents a radical of Formula B if $R_2$ is a phenyl radical, by radical of Formula B there being meant a

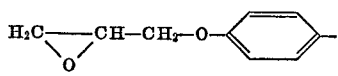

radical.

As bifunctional compounds of the above formula there may be used derivatives of cinnamic acid, for example, p-glycideoxy-cinnamic acid alkyl esters or O-glycideoxy-cinnamic acid alkyl esters, or derivatives of the cinnamoyl radical, for example 2,3-epoxy-propyloxy-4-cinnamoyl-benzene. It is advantageous to use p-glycideoxy-cinnamic acid methyl ester or 2,3-epoxypropyloxy-4-cinnamoylbenzene.

In addition to trioxane and bifunctional compounds, cyclic ethers may be used in an amount within the range of from 0 to 10% by weight calculated on the total monomer mixture. Examples of suitable cyclic ethers are ethylene oxide, propylene oxide, epichlorhydrin, 1,4-butanediolformal, diethylene glycol formal, 1,4-butenediolformal, 1,4-butanedioldiglycidyl ether, oxacyclobutane and 1,3-dioxolane.

The process of the invention yields copolymers in which the comonomer carrying the activated double bond has been incorporated into the macromolecular chain. For example, copolymers of trioxane, ethylene oxide and 2,3-epoxy-propyloxy-4-cinnamoylbenzene which had been subjected to an alkaline treatment in benzyl alcohol at 160° C. and then boiled several times with methanol showed the bands characteristic of the cinnamoyl derivative in the infrared spectrum. When these copolymers were exposed to the light of a Xenotest lamp, the intensity of the double bond bands decreased at 6.02 to 6.10μ as a function of the time of exposure. A plain proof of cross-linking taking place in the exposed copolymer is the reduction of its solubility in butyrolactone at 140° C. and the reduction of the melt indices.

The cationic polymerization may be carried out according to known methods in the melt, in solution or in suspension. As solvent or dispersing agent there may be used aliphatic or cycloaliphatic hydrocarbons with 5 to 18 carbon atoms that are inert towards the monomers and the catalyst, for example, n-hexane or cyclohexane. Advantageously, the polymerization is carried out in the melt at a temperature within the range of from +60° to +110° C.

To start the copolymerization in accordance with the invention, it is particularly advantageous to use Lewis acids (for a definition of Lewis acids see Kortüm, Lehrbuch der Elektrochemie, Wiesbaden 1948, pages 300 and 301), advantageously boron fluoride. The latter is advantageously used in the form of its complex compounds, for example, as etherate, oxonium fluoroborate or substituted aryldiazonium fluoroborate. The concentration of the catalyst depends primarily on the efficacy of the catalyst as a polymerization initiator and may be within the range of from 0.0001 to 1.0% by weight, calculated on the total monomer mixture.

To remove unstable terminal semi-acetal groups, the copolymers obtained by the process of the invention may be subjected to an alkaline degradation known in itself (cf. Belgian Patent No. 617,897). It is advantageous to add to the copolymers also a known light or oxidation stabilizer (cf. Deutsche Auslegeschrift No. 1,104,695 and Deutsche Auslegeschrift No. 1,129,689).

The copolymers obtained by the process of the invention are heat resistant and can be worked in the thermoplastic range. They can be used for the manufacture of mouldings and sheets or films which can be superfically cross-linked by subsequent exposure to light.

The following examples serve to illustrate the invention, but are not intended to limit it.

EXAMPLE 1

To a batch consisting of 1000 g. trioxane, 20 g. ethylene oxide and 30 g. p-glycideoxy cinnamic acid methyl ester there were added, as a catalyst, 35 cc. boron fluoride dibutyl ethereate which had been diluted to a ratio of 1:40 with cyclohexene. The batch was then polymerized in a closed vessel on a thermo-constant bath of 70° C. The polymerization time was 30 minutes. The polymer block so obtained was ground and treated for 30 minutes at 150° C. in benzyl alcohol to which 1% by weight of triethanolamine had been added, to remove unstable terminal semi-acetal groups and residual monomers. After cooling, the polymer was suction-filtered, boiled several times with methanol and dried at 50° C. to 70° C. under reduced pressure. The polymer was obtained in a yield of 670 g.

In the polymer so obtained the following values were determined:

Reduced specific viscosity η red. 0.78. To measure the reduced specific viscosity, 50 mg. polymer were dissolved at 140° C. in 10 cc. butyrolactone containing 0.2% of dicyanodiamide and the viscosity was measured at the said temperature of 140° C. Melt index $i_2$=1.72 and melt index $i_{20}$=234, determined according to ASTM–D 1238–52T. Heat stability $K_D$=0.0467% per minute. To determine the heat stability, a sample of the polymer was stabilized with 0.7% by weight of 2,2-methylene-bis-4-methyl-6-tert. butylphenol and 0.2% by weight of dicyanodiamide and then subjected for 45 minutes at 230° C. to thermal degradation. The $K_D$ value indicates the loss in weight in percent per minute.

After exposing the powder for 10 hours to the light of a Xenotest lamp, the following values were determined:

The value η red. could no longer be measured since the polymer was only to a small extent soluble in butyrolactone. Melt index $i_2$=0.77 and melt index $i_{20}$=150 (the product which had been exposed to the light of the Xenotest lamp yielded no clear melt). $K_D$=0.0154.

EXAMPLE 2

In a manner analogous to Example 1, 1000 g. trioxane, 20 g. ethylene oxide and 10 g. p-glycideoxy cinnamic acid methyl ester were polymerized in the presence of 20 cc. boron fluoride dibutyl etherate (1:40). After alkaline degradation, the yield amounted to 654 g. The following values were determined:

η red.=0.33; $K_D$=0.0253.

EXAMPLE 3

In a manner analogous to Example 1, 100 g. trioxane, 2 g. ethylene oxide and 10 g. p-glycideoxy cinnamic acid methyl ester were polymerized in the presence of 4.5 cc. boron fluoride dibutyl etherate (1:40). The yield amounted to 62 g.

The following values were determined:

$i_{20}$=23; $K_D$=0.0488; softening point of copolymer about 147° C.

EXAMPLE 4

In a manner analogous to Example 1, 100 g. trioxane, 2 g. ethylene oxide and 3 g. 2,3-epoxy-propyloxy-4-cinnamoylbenzene were copolymerized in the presence of 10 mg. p-nitro-phenyldiazonium fluoroborate. The polymerization time was 2 hours. After alkaline degradation, 67 g. of a copolymer were obtained in which a value $i_2$ of 12.8 and a value $K_D$ of 0.015 were determined.

As shown by the infrared spectrum, the cinnamoyl derivative had been incorporated into the polymer chain by the polymerization. On irradiation, the intensity of the double bond band decreased at 6.02µ.

What is claimed is:

1. A process for the manufacture of copolymers of 70 to 99.5% by weight of trioxane, 0.5 to 20% by weight of bifunctional compounds and 0 to 10% by weight of cyclic ethers in the presence of cationic catalysts at temperatures within the range of from −50° to +110° C., which comprises using a bifunctional compound of the formula

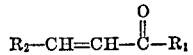

in which $R_1$ represents an O-alkyl radical with 1 to 6 carbon atoms if $R_2$ is a radical of Formula B given below, or $R_1$ represents a radical of Formula B if $R_2$ is a phenyl radical, by radical of Formula B there being meant a

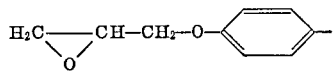

radical.

2. A copolymer of trioxane prepared by the process of claim 1.

References Cited

UNITED STATES PATENTS 3,275,604   9/1966   Kray et al. _____ 260—67

WILLIAM H. SHORT, *Primary Examiner.*

H. SCHAIN, *Assistant Examiner.*

U.S. Cl. X.R.

260—67